(12) United States Patent
Zhang et al.

(10) Patent No.: US 12,111,286 B2
(45) Date of Patent: Oct. 8, 2024

(54) ION MOBILITY ANALYSIS APPARATUS

(71) Applicant: Shimadzu Corporation, Kyoto (JP)

(72) Inventors: Xiaoqiang Zhang, Shanghai (CN); Keke Wang, Shanghai (CN); Wenjian Sun, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 296 days.

(21) Appl. No.: 17/712,506

(22) Filed: Apr. 4, 2022

(65) Prior Publication Data

US 2022/0341874 A1 Oct. 27, 2022

(30) Foreign Application Priority Data

Apr. 21, 2021 (CN) .......................... 202110429155.7

(51) Int. Cl.
*G01N 27/622* (2021.01)
*H01J 49/00* (2006.01)
*H01J 49/40* (2006.01)

(52) U.S. Cl.
CPC .......... *G01N 27/622* (2013.01); *H01J 49/004* (2013.01); *H01J 49/40* (2013.01)

(58) Field of Classification Search
CPC ... G01N 27/622; G01N 27/623; H01J 49/004; H01J 49/429
See application file for complete search history.

(56) References Cited

U.S. PATENT DOCUMENTS

| 2011/0266435 | A1* | 11/2011 | Hoyes | G01N 27/623 |
| | | | | 250/288 |
| 2011/0291001 | A1* | 12/2011 | Hoyes | H01J 49/0081 |
| | | | | 250/288 |
| 2016/0231275 | A1* | 8/2016 | Park | H01J 49/06 |
| 2019/0056351 | A1* | 2/2019 | Zhang | H01J 49/063 |
| 2019/0162698 | A1* | 5/2019 | Gillig | H01J 49/061 |
| 2019/0164737 | A1* | 5/2019 | Gillig | H01J 49/063 |
| 2021/0313161 | A1* | 10/2021 | Sun | G01N 30/72 |
| 2023/0417704 | A1* | 12/2023 | Zhang | G01N 27/623 |

FOREIGN PATENT DOCUMENTS

CN 109003876 A 12/2018

* cited by examiner

*Primary Examiner* — Michael J Logie
(74) *Attorney, Agent, or Firm* — Locke Lord LLP; Tim Tingkang Xia, Esq.

(57) ABSTRACT

A high duty cycle ion mobility analysis apparatus includes an ion source, first and second ion storage zones, and an ion mobility analyzer. The ion mobility analyzer includes first and second channels containing a gas flow coaxial with an ion migration direction and a direct current electric field in the opposite direction of the gas flow, and the direct current electric fields in the channels are different in strength. In a continuous scanning period, ions that have not reached appropriate scanning conditions or have missed the appropriate scanning conditions and thus are unable to pass through the mobility analyzer are temporarily stored in two independent ion storage zones without being lost to be analyzed by the mobility analyzer until conditions of the scanning period or a next scanning period are appropriate.

16 Claims, 10 Drawing Sheets

ION MOBILITY ANALYSIS APPARATUS

CROSS-REFERENCE TO RELATED PATENT APPLICATION

This application claims priority to and the benefit of Chinese Patent Application Serial No. 202110429155.7, filed Apr. 21, 2021, which is incorporated herein in its entirety by reference.

TECHNICAL FIELD

The present invention relates to ion mobility spectrometry, and particularly relates to a high duty cycle filter-type ion mobility analysis apparatus.

BACKGROUND ART

Ion mobility spectrometers can be used to analyze the mobility or differential mobility of ions. The ion mobility spectrometers are in many forms, such as drift cell ion mobility spectrometry, travelling wave ion mobility spectrometry, trapped ion mobility spectrometry, high-field asymmetric waveform ion mobility spectrometry (FAIMS), differential ion mobility spectrometry (DMS), and differential ion mobility analyzers (DMA). The operating modes of these ion mobility spectrometers are different, wherein DMA, DMS and FAIMS belong to a mobility filter type, namely, under a certain operating condition, the mobility spectrometer only allows ions within a certain mobility (or differential mobility) range to pass through, and the remaining ions are filtered out and totally lost; and by scanning the operating condition, ions with different mobilities (or differential mobilities) can pass through successively to obtain a spectrum. For example, for the differential ion mobility analyzer (DMA), the value of amplitude of an electric field orthogonal to the direction of a gas flow can be scanned so that the ions with different mobilities pass through a receiving slit successively to obtain a mobility spectrum. With regard to a U-shaped ion mobility spectrometer described in the patent CN2017104191571, it is possible to scan the field intensities $E_1$ and $E_2$ of first and second channels simultaneously, and keep a difference value between $E_2$ and $E_1$ unchanged, so that the ions with different mobilities can successively pass through the apparatus to obtain the mobility spectrum. The ion utilization efficiency of such a filter-type ion mobility spectrometer is very low in one scanning period. This ion utilization efficiency is hereinafter defined as the duty cycle of an instrument according to the usage of trade, and particularly for higher resolution filter-type mobility spectrometry apparatuses, the duty cycle is generally less than 1%.

In non-filter-type mobility spectrometers, the duty cycle can be increased in the prior art, for example, in the drift cell mobility spectrometry, the travelling wave mobility spectrometry, or the trapped ion mobility spectrometry, an ion storage zone can be disposed in front of the entrance of a mobility analyzer; before performing mobility analysis, a continuous ion flow is constantly accumulated and stored in this zone, and then pulsed to be released to the mobility analyzer for analysis, thus theoretically achieving a 100% duty cycle. However, this process inevitably leads to a reduction in other properties, such as the reduction of a resolution or dynamic range. Whereas in a filter-type ion mobility spectrometer, the prior art does not provide a high duty cycle ion mobility analysis apparatus, due to the reduction in duty cycle caused by the filtering behavior itself.

SUMMARY OF THE INVENTION

In view of the above problems, the present invention provides a high duty cycle ion mobility analysis apparatus, which can improve the ion utilization efficiency of a filter-type ion mobility spectrometer during continuous scanning, thereby improving the sensitivity of an instrument.

To achieve the above-mentioned purposes and other correlated purposes, the present invention provides an ion mobility analysis apparatus and a corresponding ion mobility analysis method, and the ion mobility analysis apparatus comprises:

an ion source for continuously generating ions, which contain analyte ions; and an ion mobility analyzer located downstream of the ion source for receiving the ions generated by the ion source and performing mobility analysis, a first ion storage zone and a second ion storage zone being in the ion mobility analyzer;

the ion mobility analyzer scans at least one operating parameter f(t) in an operating period from $t_0$ to $t_1$, so that ions with different mobilities pass through the ion mobility analyzer sequentially, the operating parameter f(t) is a monotonic function of time t, the analyte ions can pass through the analyzer in an operating parameter range of [f($t_A$), f($t_B$)], and $t_0 < t_A < t_B < t_1$;

the operating period is repeated multiple times, and in each operating period:

in the stage of $t_0 \le t < t_A$, at least part of the analyte ions filtered out by the ion mobility analyzer in the stage are transmitted and stored in the first ion storage zone;

in the stage of $t_B < t \le t_1$, at least part of the analyte ions filtered out by the ion mobility analyzer in the stage are transmitted and stored in the second ion storage zone;

in the stage of $t_A \le t \le t_B$, the analyte ions generated by the ion source, the analyte ions stored in the first ion storage zone in the same operating period, and the analyte ions stored in the second ion storage zone in the previous operating period can pass through the ion mobility analyzer to enter a next stage analysis apparatus or be detected by a detector.

As mentioned above, the ion mobility analysis apparatus and method of the present invention have the following beneficial effects.

In a continuous scanning period, ions that have not reached appropriate scanning conditions or have missed the appropriate scanning conditions and thus are unable to pass through the ion mobility analyzer; and they are temporarily stored in two independent ion storage zones without being lost; and then they are driven to be analyzed by the ion mobility analyzer when conditions of the scanning period or a next scanning period are appropriate. Thus, even for a filter-type ion mobility spectrometer, a near 100% ion utilization efficiency can theoretically be achieved, which improves the duty cycle of an ion mobility spectrometry instrument, thereby improving its sensitivity and qualitative capability for practical analysis. The ion mobility analysis apparatus and method of the present invention can be applied to various types of ion mobility spectrometers such as DMA, DMS/FAIMS, U-shaped ion mobility spectrometers, etc.

REFERENCE NUMERALS

Figure 1:
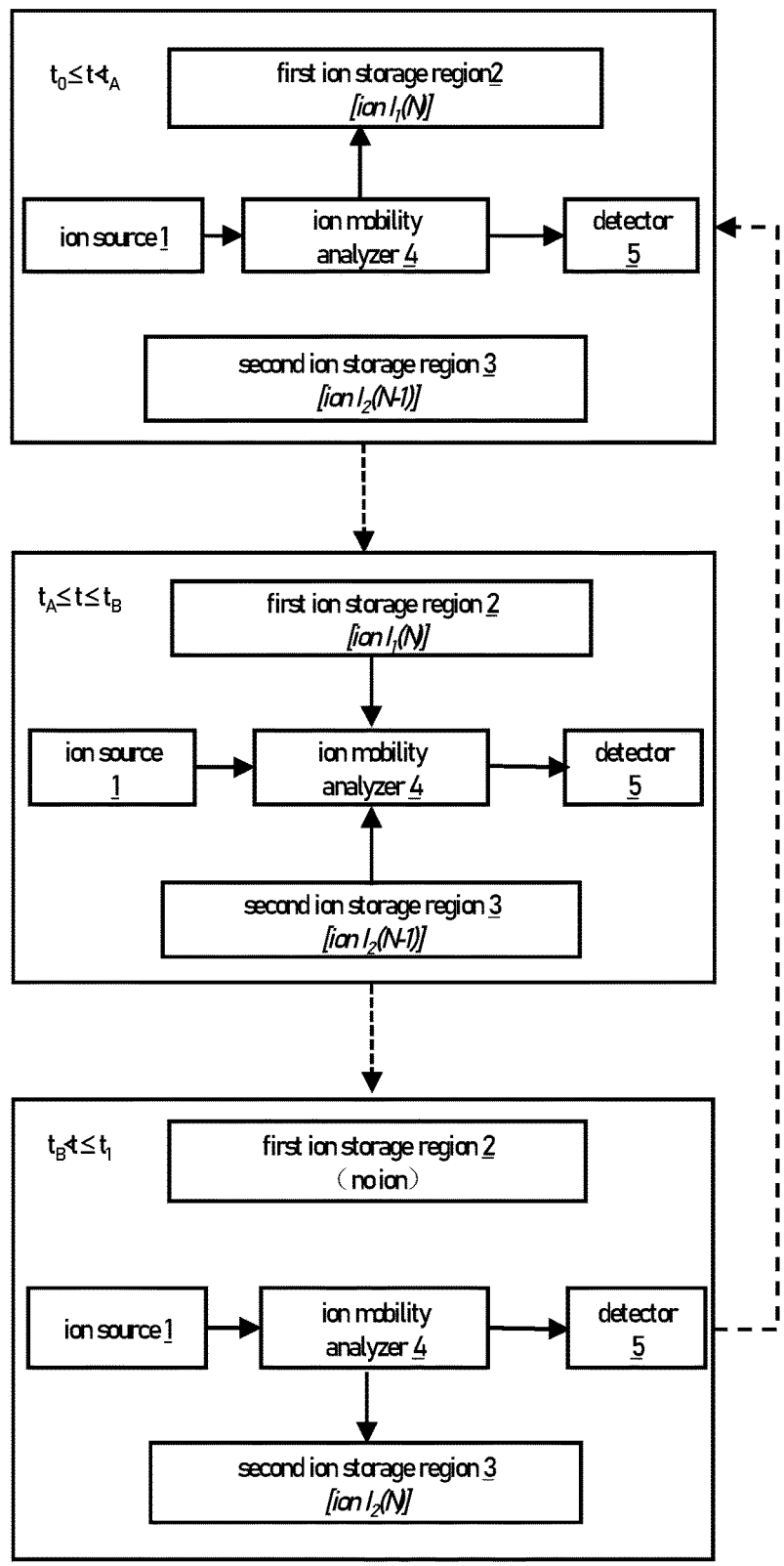
FIG. 1 is a schematic view of an analysis flow of an ion mobility analysis apparatus in a first embodiment of the present invention.

1—ion source;
2—first ion storage zone;
3—second ion storage zone;
4—ion mobility analyzer;
5—detector;
6—mass analyzer;
40—first channel;
41—second channel;
7—U-shaped ion mobility analyzer;
8—quadrupole mass filter;
9—collision cell; and
10—time of flight mass spectrometer.

DETAILED DESCRIPTION OF THE INVENTION

Embodiments of the present invention are described below by specific embodiments, and other advantages and effects of the present invention can be easily known by those skilled in the art from the content disclosed in this specification.

It should be noted that structures, proportions, sizes, etc. shown in the drawings and formulas of this specification are all only used to cooperate with the contents disclosed in this specification, so as to be understood and read by those who are familiar with the technology, are not used to limit the implementation conditions of the present invention, and thus do not have technically substantive significance, and any modification of the structure, changes of a proportional relationship or adjustment of the size, without affecting the effect that the present invention can produce and the purpose that the present invention can achieve, should still fall within the range of the technical content disclosed in the present invention. At the same time, the terms such as "up", "down", "left", "right", "middle" and "one" quoted in this specification are only for the clarity of description, and are not used to limit the implementable scope of the present invention, and the change or adjustment of the relative relationship thereof shall also be regarded as the implementable scope of the present invention without substantially changing the technical content.

"Mobility" or "mobility spectrometry" mentioned in this specification includes not only "mobility" or "mobility spectrometry" related to an ion collision cross section (CCS), but also "differential mobility" or "differential mobility spectrometry" which are related to an electric field strength. In this specification, the ions "pass through" a certain apparatus or analyzer, meaning that the ions can spatially pass through an operating zone of the apparatus or analyzer and be transmitted to a next stage apparatus.

FIG. 1 is a schematic view of an analysis flow of a first embodiment of the present invention. The analysis flow is suitable for a scanning-type ion mobility spectrometry apparatus. The apparatus comprises an ion source 1, the ion source 1 generates a large number of ions, including target analyte ions to be analyzed and other ions, an ion mobility analyzer 4 is downstream of the ion source 1, and after being analyzed by the ion mobility analyzer 4, the ions are transmitted to a detector 5 to be detected to form an ion mobility spectrum. The ion mobility analyzer 4 is set to operate in a periodic scanning mode, a typical operating period is defined as from $t_0$ to $t_1$, and in the operation period, the ion mobility analyzer 4 scans at least one operating parameter f(t), and preferably scans an electric field strength E(t) in the ion mobility analyzer, so that ions with different mobilities pass through the ion mobility analyzer 4 in sequence. It corresponds to a mobility value of the target analyte ion so that the target analyte ion can pass through the ion mobility analyzer 4 in an operating parameter range of $[E(t_A), E(t_B)]$, wherein $t_0 < t_A < t_B < t_1$. The apparatus also includes two zones for temporarily storing ions, specifically a first ion storage zone 2 and a second ion storage zone 3, both located downstream of the ion source 1.

Any one operating period of this embodiment, such as the Nth period, can be divided into the following three stages.

The first stage is the stage of $t_0 \le t < t_A$, at this time, conditions of the ion mobility analyzer 4 (such as electric field strength conditions) are not suitable for the target analyte ions to pass through, and the target analyte ions generated by the ion source in this stage may pass through a part of the ion mobility analyzer to enter the first ion storage zone 2, the stored target analyte ions are marked as "ions $I_1(N)$", the subscript 1 represents being stored in the first ion storage zone 2, and N represents that it is stored in the Nth period; at this time, the second ion storage zone 3 stores target analyte ions $I_2(N-1)$ stored in the previous period, and its generation and storage process will be described hereinafter.

The second stage is the stage of $t_A \le t \le t_B$, at this time, the conditions of the ion mobility analyzer 4 are suitable for the target analyte ions to pass through, and the target analyte ions generated by the ion source 1 in this stage, the target analyte ions $I_1(N)$ stored in the first ion storage zone 2 in the same period, and some kind of analyte ions $I_2(N-1)$ stored in the second ion storage zone 3 in the previous period will enter together and pass through the ion mobility analyzer 4 completely and then reach the detector 5 to be detected; after this stage is completed, the ions in the first ion storage zone 2 and the second ion storage zone 3 have been cleared.

The third stage is the stage of $t_B<t\leq t_1$, at this time, the conditions of the ion mobility analyzer 4 become unsuitable for the target analyte ions to pass through, and the target analyte ions generated by the ion source 1 in this stage may pass through part of the ion mobility analyzer 4 to enter the second ion storage zone 3, and the stored target analyte ions are marked as "ions $I_2(N)$", while the first ion storage zone 2 still remains an ion cleared state.

In the next period, namely, the (N+1)th period, the three stages described above will be repeated, for example, in the first stage, the ions $I_1(N+1)$ will continue to be stored, in the second stage, the ions are transmitted completely, and in the third stage, the ions $I_2(N+1)$ will be stored. All the periods cycle in sequence until the end of this analysis.

In this embodiment, in the first period, $I_2(0)$ is actually an empty ion packet; and in the last period M, $I_2(M)$ will not have an opportunity to enter the ion mobility analyzer 4, so at the end of one analysis, a clearing stage can be additionally set to clear the $I_2(M)$ to avoid interference to next analysis.

In this embodiment, due to the use of the two ion storage zones, in one continuous operating period, ions that have not reached appropriate scanning conditions or have missed the appropriate scanning conditions and thus are unable to pass through the ion mobility analyzer 4 are temporarily stored in one of the two ion storage zones without being lost, and then the ions are transmitted out to be analyzed by the ion mobility analyzer 4 until conditions of the operating period or a next operating period are appropriate. By the above means, almost all the target analyte ions are finally analyzed and detected by the ion mobility analyzer 4, which effectively reduces an ion loss in a scanning process, so that the ion utilization efficiency, or the duty cycle of the ion mobility analysis apparatus, can reach a level close to 100%. However, in a traditional scanning process, the duty cycle depends on the proportion of a suitable ion transmission duration in the whole period, and this proportion is often negatively correlated with the resolution or scanning range, so to reach a higher resolution or wider scanning range, the duty cycle is often very low, thus limiting the sensitivity of the instrument.

Figure 2:
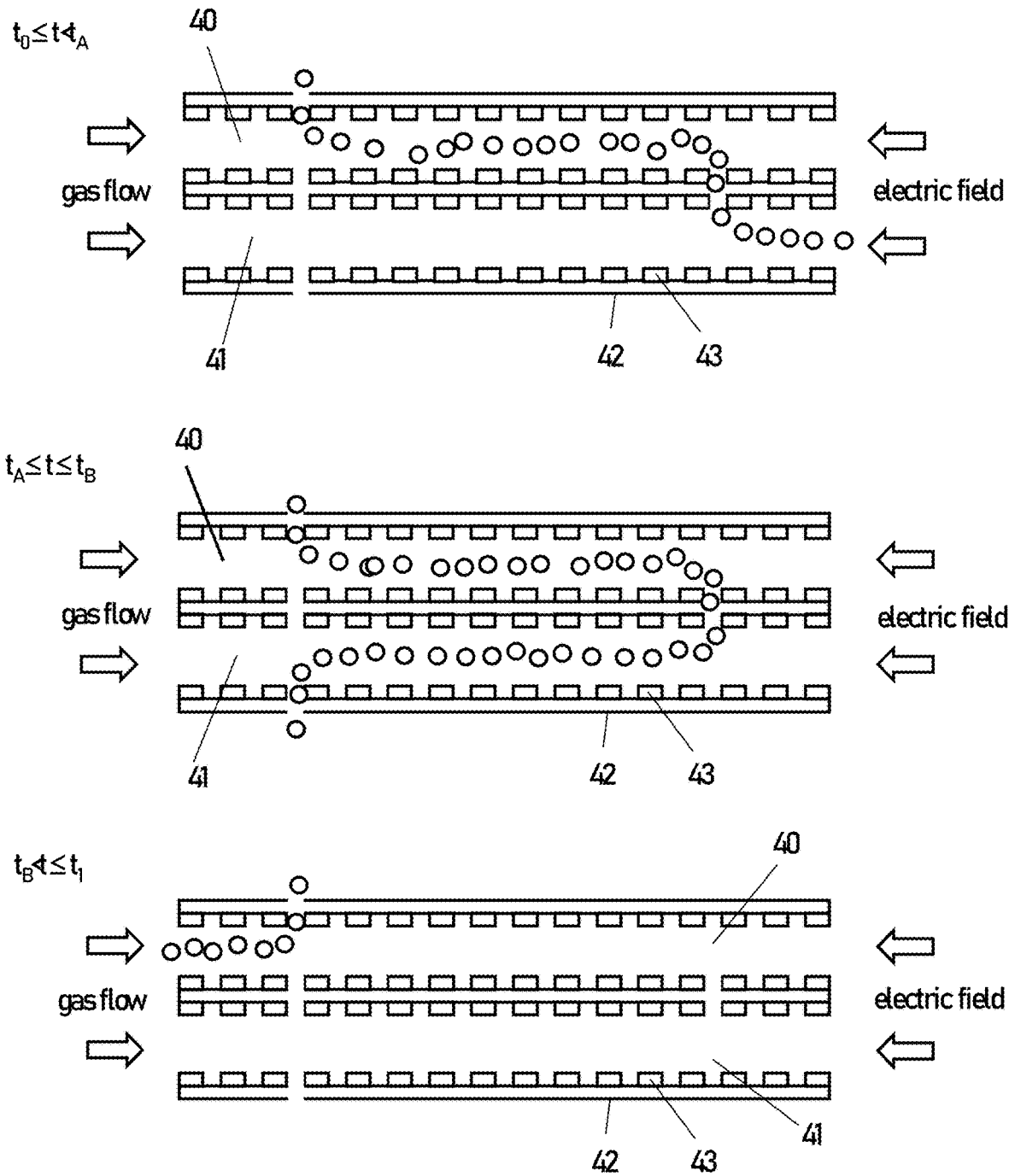
FIG. 2 is a schematic view of a structure of an ion mobility analysis apparatus in the prior art and an analysis process in one period.
Figure 3:
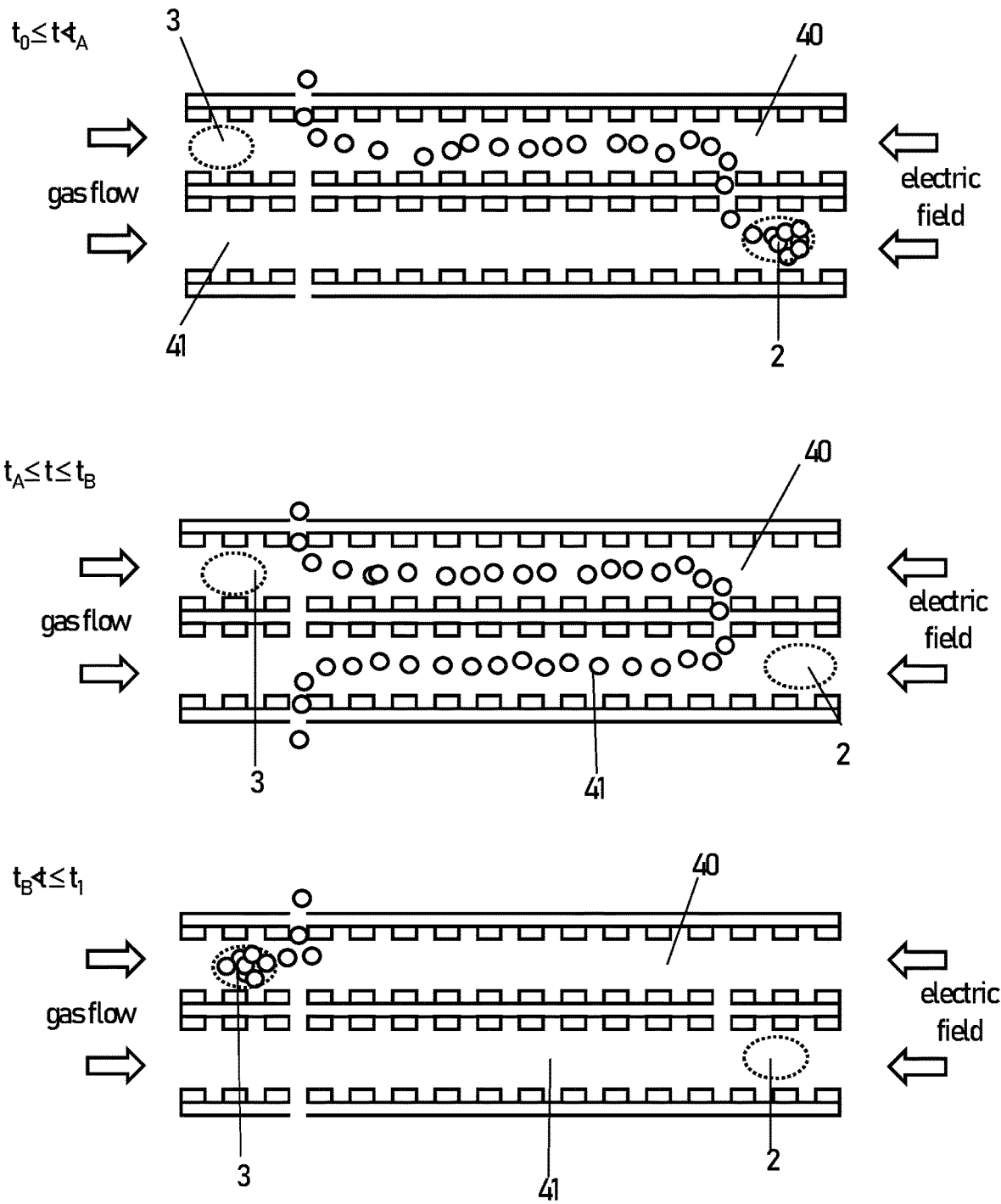
FIG. 3 is a schematic view of a structure of the ion mobility analysis apparatus in the first embodiment of the present invention and an analysis process in one period.
Figure 4:
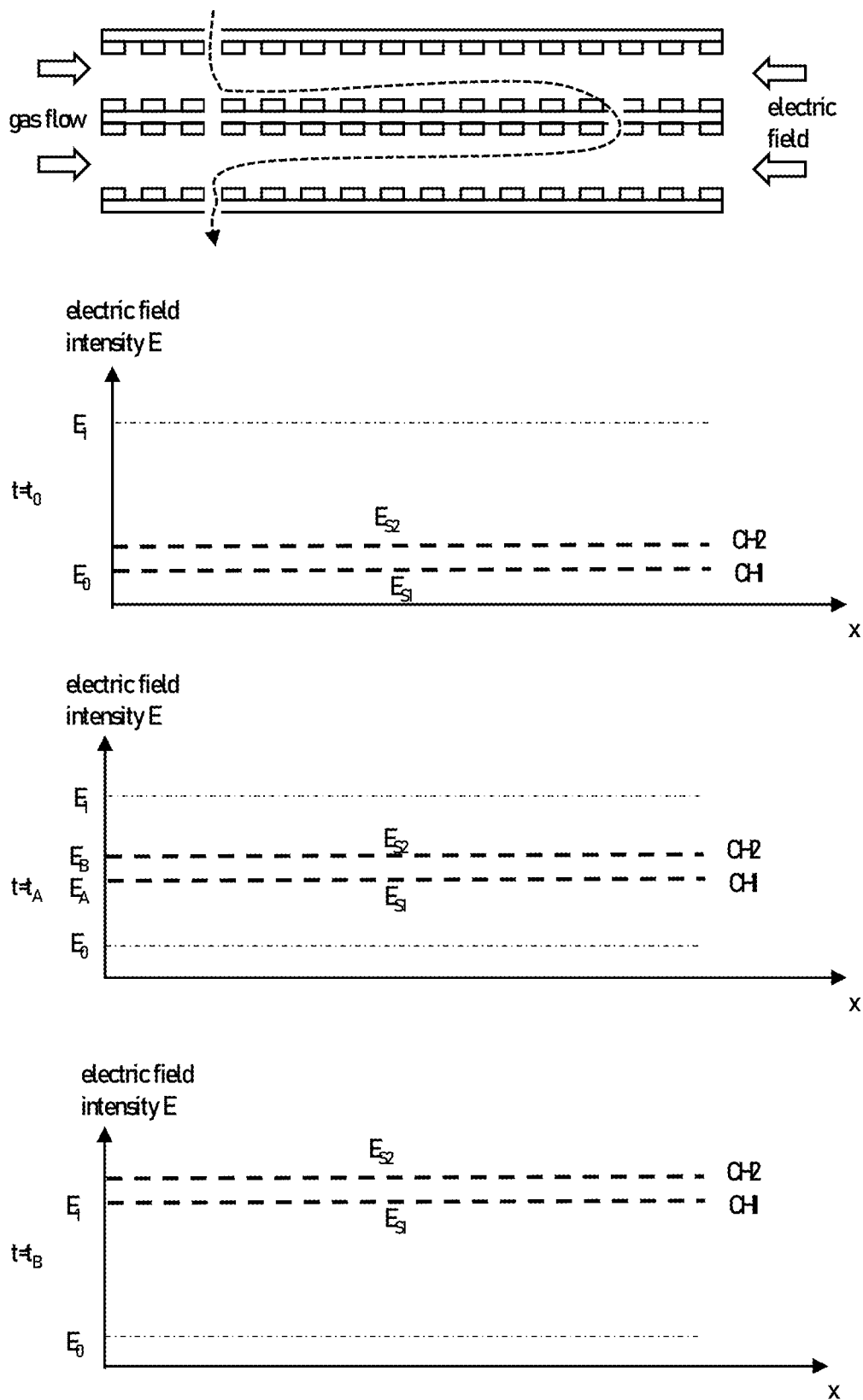
FIG. 4 is a schematic view of direct current field scanning of the ion mobility analysis apparatus in the prior art.
Figure 5:
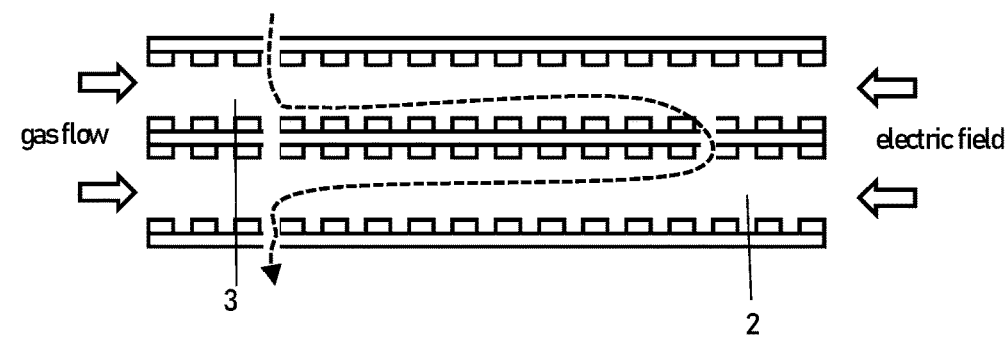
FIG. 5 is a schematic view of direct current electric field scanning of the ion mobility analysis apparatus in the first embodiment of the present invention.
Figure 5:
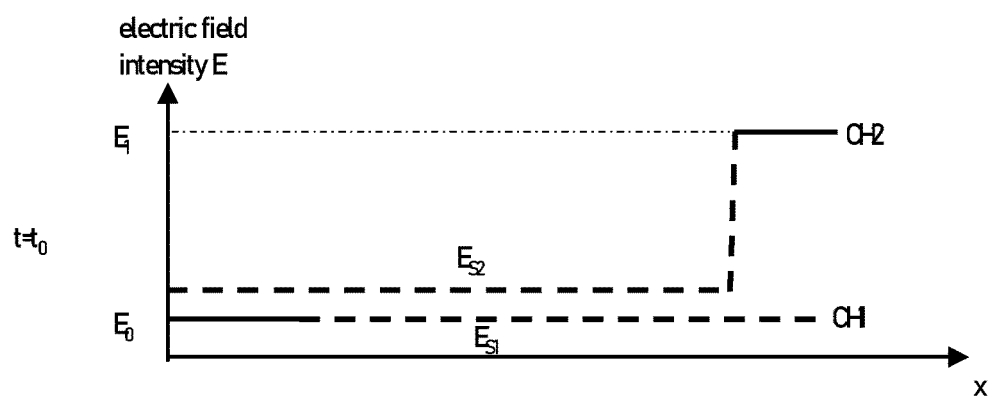
Figure 5:
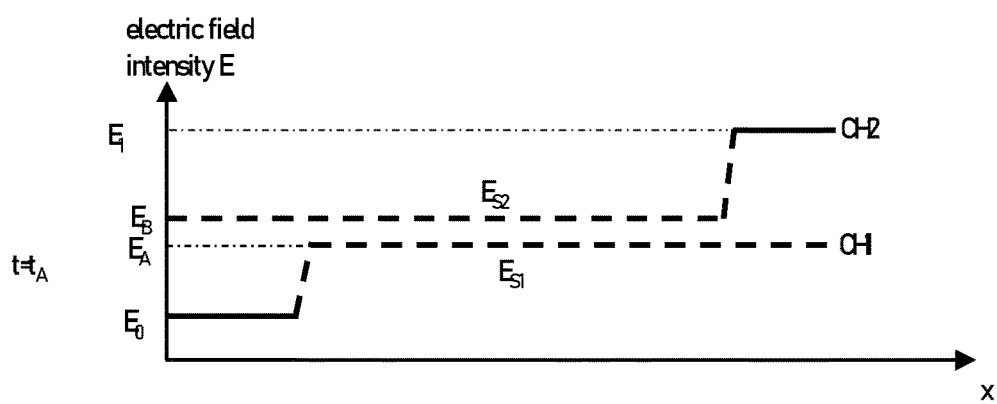
Figure 5:
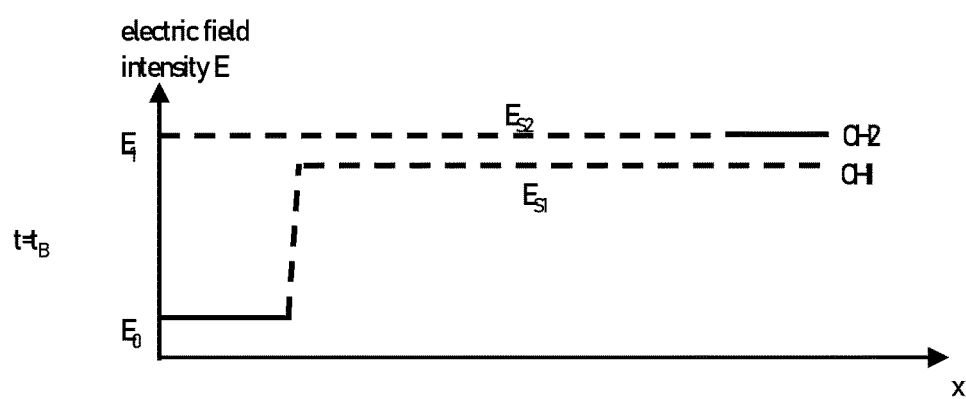

FIG. 2 to FIG. 5 compare differences between the prior art and the first embodiment of the present invention. FIG. 2 and FIG. 4 are apparatus views and schematic views of direct current electric field scanning in the prior art, and FIG. 3 and FIG. 5 are apparatus views and schematic views of direct current electric field scanning according to the first embodiment of the present invention. An ion mobility analyzer in the prior art is a U-shaped mobility analyzer described in the patent CN2017104191571, the U-shaped mobility analyzer includes two parallel channels: a first channel 40 and a second channel 41, each of the channels is defined by a substrate 42 where an electrode array is located and an electrode array 43 covering it (only one of the substrates and one electrode in the electrode array are marked in the figure), and there are a gas flow coaxial with an ion migration direction, and a direct current electric field in the opposite direction of the gas flow in the channel, a field strength ($E_{S1}$) of the direct current electric field in the first channel 40 is slightly lower than a field strength ($E_{S2}$) in the second channel 41, then at a specific moment in an operating period, only ions with mobility larger than a certain set ion mobility $K_1$ can pass through the first channel 40, and only ions with mobility less than a set ion mobility $K_2$ can pass through the second channel 41, wherein $K_1<K_2$, so that only the ions with mobility between $K_1$ and $K_2$ can pass through the U-shaped mobility analyzer, that is, the analyzer is a filter-type ion mobility analyzer. Referring to FIG. 4, in one operating period, $E_{S1}$ and $E_{S2}$ are gradually enhanced, for example, $E_{S1}$ is linearly scanned from $E_0$ to $E_1$, and a difference value between the two $\Delta E=E_{S2}-E_{S1}$ remains unchanged in the entire scanning process. The mobility of the target analyte ion is $K_T$, and the condition suitable for the target analyte ion to pass through is $E_A<E_{S1}<E_B$. For this analyzer, it can be approximately considered that $\Delta E=E_B-E_A$. The following is the scanning process in one operating period of the prior art shown in FIG. 4.

At the beginning of scanning ($t=t_0$), $E_{S1}=E_0$, and $E_{S2}=E_0+\Delta E$, as shown by thick dashed lines in FIG. 4, then $E_{S1}$ and $E_{S2}$ increase synchronously until $t=t_A$, $E_{S1}=E_A$, $E_{S2}=E_A+\Delta E=E_B$; in the stage from $t_0$ to $t_A$, due to an insufficient field strength in the first channel 40, the target analyte ions will be carried by the gas flow to pass through the first channel 40, and transmitted to a right end of the second channel 41 by a deflecting electric field, and then carried away by the gas flow to be lost.

In the stage from $t_A$ to $t_B$, if the ion mobility analysis apparatus is suitable for the target analyte ions to pass through, the target analyte will pass through the first channel 40, then is deflected to the right end of the second channel 41, continues to pass through the second channel 41 to the left, and finally, enters the next stage through an exit of the second channel 41; this state continues until $t=t_B$, at this moment, $E_{S1}=E_B$, and $E_{S2}=E_B+\Delta E$.

In the stage from $t_B$ to $t_1$, $E_{S1}$ is scanned to increase from $E_B$ to $E_1$, at this stage, for the analyte ions, the magnitude of an acting force exerted by the field strength in the first channel 40 on the ions has exceeded the influence of the gas flow, and the analyte ions are repulsed leftwards to the tail end of the left side by the field strength to be lost as soon as they enter the first channel 40.

In the present invention, referring to FIG. 3, the first ion storage zone 2 is disposed on a right side of the second channel 41, the second ion storage zone 3 is disposed on a left side of the first channel 40, and the field strength of the ion storage zone is set different from that of a zone covered by an ion passing path, as shown in FIG. 5, the thick dashed lines $E_{S1}$ and $E_{S2}$ are the field intensities in the channel in the scanning process, thick solid lines are the field intensities in the ion storage zone, and they can be kept unchanged in the scanning process. The following is one scanning process of the present invention.

At the beginning of scanning ($t=t_0$), $E_{S1}=E_0$, $E_{S2}=E_0+\Delta E$, a field strength in the second ion storage zone 3 is $E_0$, a field strength in the first ion storage zone 2 is $E_1$, then $E_{S1}$ and $E_{S2}$ are synchronously scanned to enhance until $t=t_A$, $E_{S1}=E_A$, $E_{S2}=E_A+\Delta E=E_B$, and in the field strength scanning enhancement process of the above-mentioned channel zone, the field strength in the ion storage zone remains unchanged; in the stage from $t_0$ to $t_A$, due to an insufficient field strength in the channel, the target analyte ions will be carried by the gas flow to pass through the first channel 40, and are transmitted to a right end of the second channel 41 by a deflecting electric field, since the field strength in the first storage zone 2 at this position is strong, its acting force on the ions is greater than that generated by the gas flow, and the analyte ions can not escape out of the zone, and the field strength in the second channel 41 is still relatively weak and thus cannot continue to transmit ions to the left, so the ions will be stored in the first ion storage zone 2.

In the stage from $t_A$ to $t_B$, the ion mobility analysis apparatus is suitable for the target analyte ions to pass through, then the target analyte ions entering from the ion source 1 will pass through the first channel 40, and then are U-deflected to the second channel 41, at this time, the ions stored in the first storage zone 2 are also released at the same time, and these ions pass through the second channel 41 together, and then enter a next stage through the exit of the second channel 41; this state continues until t=$t_B$, at this moment, $E_{S1}=E_B$, and $E_{S2}=E_B+\Delta E$.

In the stage from $t_B$ to $t_1$, $E_{S1}$ is scanned to increase from $E_B$ to $E_1$, at this stage, for the analyte ions, the field strength in the first channel 40 has exceeded the influence of the gas flow, and the analyte ions are repulsed leftwards to the left side by the field strength as soon as they enter the first channel 40, but in the second ion storage zone 3 on the left side, the field strength is very low and cannot continue to push the ions, so the ions will be stored in the second ion storage zone 3 and these ions will be released from the second ion storage zone 3 in the stage from $t_A$ to $t_B$ in the next period, and pass through the first channel 40 and the second channel 41 together with the ions entering from the ion source 1 to be analyzed.

Figure 6:
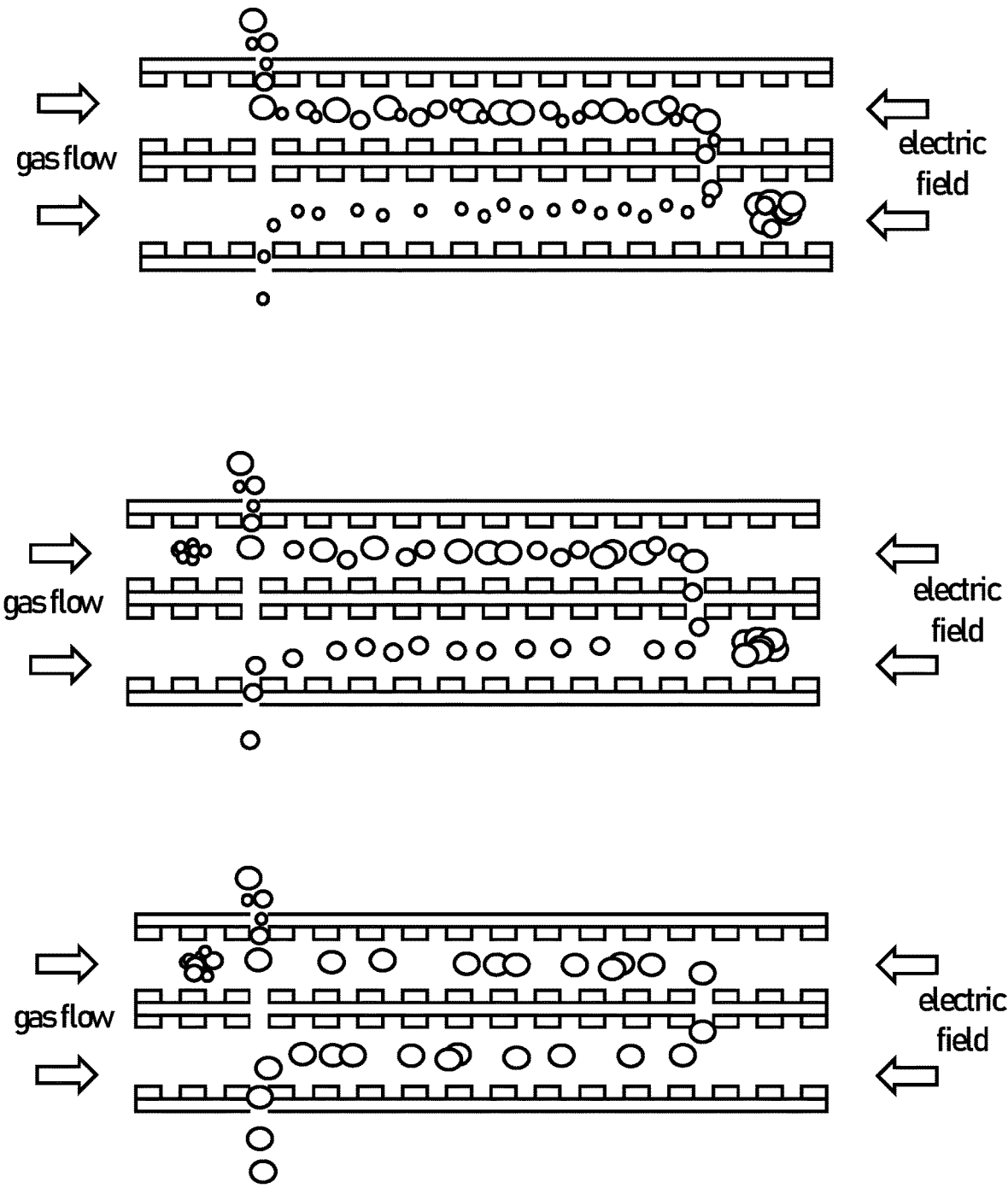
FIG. 6 is a schematic view of a scanning mode when the ion mobility analysis apparatus in the first embodiment of the present invention performs analysis of various target ions.

In actual analysis, there may be more than one kind of target analyte ions, or sometimes it is non-target analysis, and the present invention is also completely applicable to these situations. FIG. 6 shows a case of three kinds of target ions, respectively corresponding to three kinds of ions with high, medium and low mobilities. In the scanning process, the ions of the high mobility (including those entering from a zone of the ion source and those stored in the second ion storage zone in the previous period) are firstly swept out, while the ions of the medium and low mobilities are stored in the first ion storage zone 2, and then the ions of the medium mobility (including those entering from a zone of the ion source 1 and those stored in the first ion storage zone 2) are swept out, while the ions of high mobility will be stored in the second ion storage zone 3, the ions of the low mobility continue to be stored in the first ion storage zone 2, and finally the ions of the low mobility (including those generated by the ion source 1 and those stored in the first ion storage zone 2) are swept out, while the ions of the medium and high mobilities are stored in the second ion storage zone 3. It should be noted that this dynamic process occurs naturally in the scanning process due to the field strength setting as previously described, and in practical operation, it is not necessary to know in advance when ions will be released from the storage zone. That is, the process is equivalent for all the ions in the scanning range, which can be completely applicable to the scanning of non-target ions, while the utilization efficiency (or duty cycle) of all the ions in the scanning range is near 100%.

Figure 7:
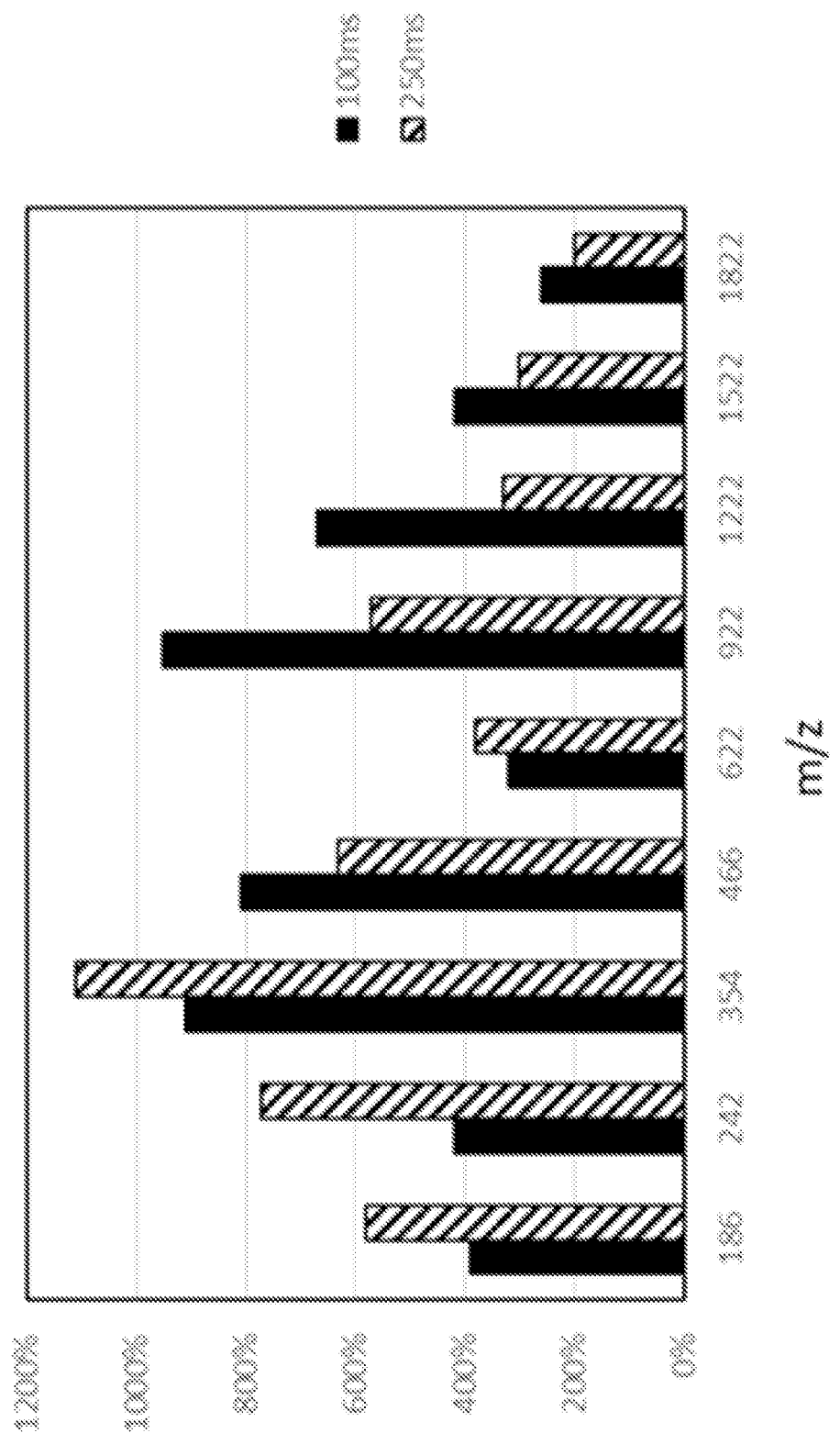
FIG. 7 is an experimental result view of the ion mobility analysis apparatus in the first embodiment of the present invention.

FIG. 7 can demonstrate the technical effect that the ion mobility analysis apparatus in the first embodiment of the present invention can produce. A horizontal axis is m/z of an experimental sample and a vertical axis is the obtained ion signal gain by using the first embodiment (namely, a 100% duty cycle scanning mode) compared to the prior art (namely, a conventional scanning mode). FIG. 7 gives results for two different operating periods (100 milliseconds and 250 milliseconds) in the first embodiment. It can be seen that by selecting a wider mobility range for scanning, the ion intensity of this embodiment is significantly improved, and the ion intensity of some samples is even improved by one order magnitude, while the resolution is kept unchanged or only slightly decreased so as to balance the duty cycle and resolution of the ion mobility analysis apparatus.

Figure 8A:
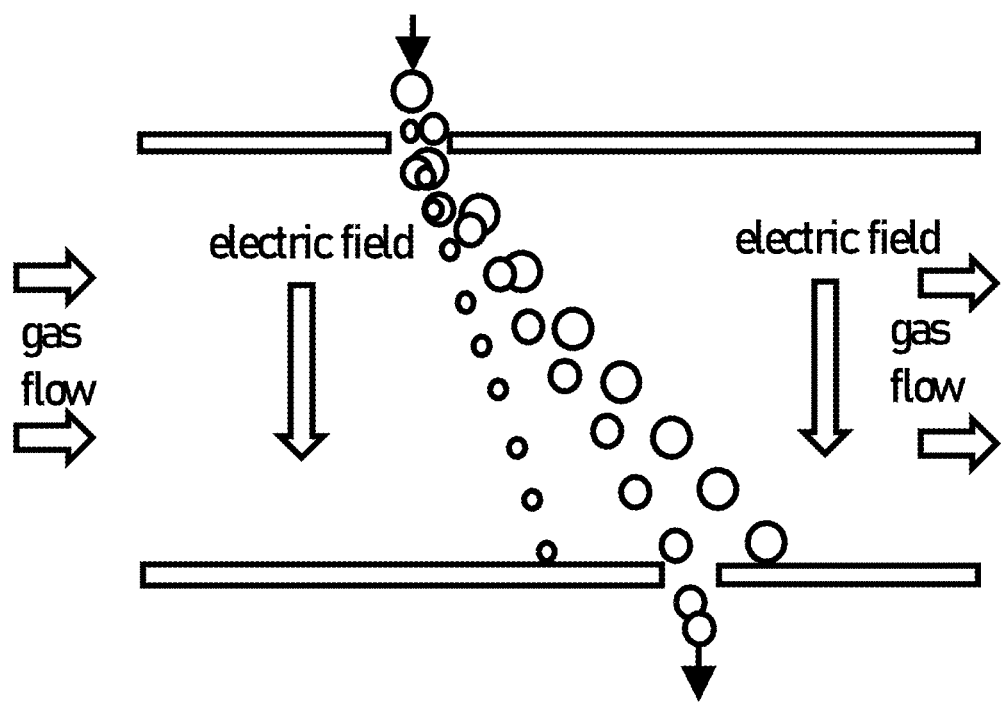
FIG. 8A is a schematic view of an analysis process of the ion mobility analysis apparatus in the prior art.
Figure 8B:
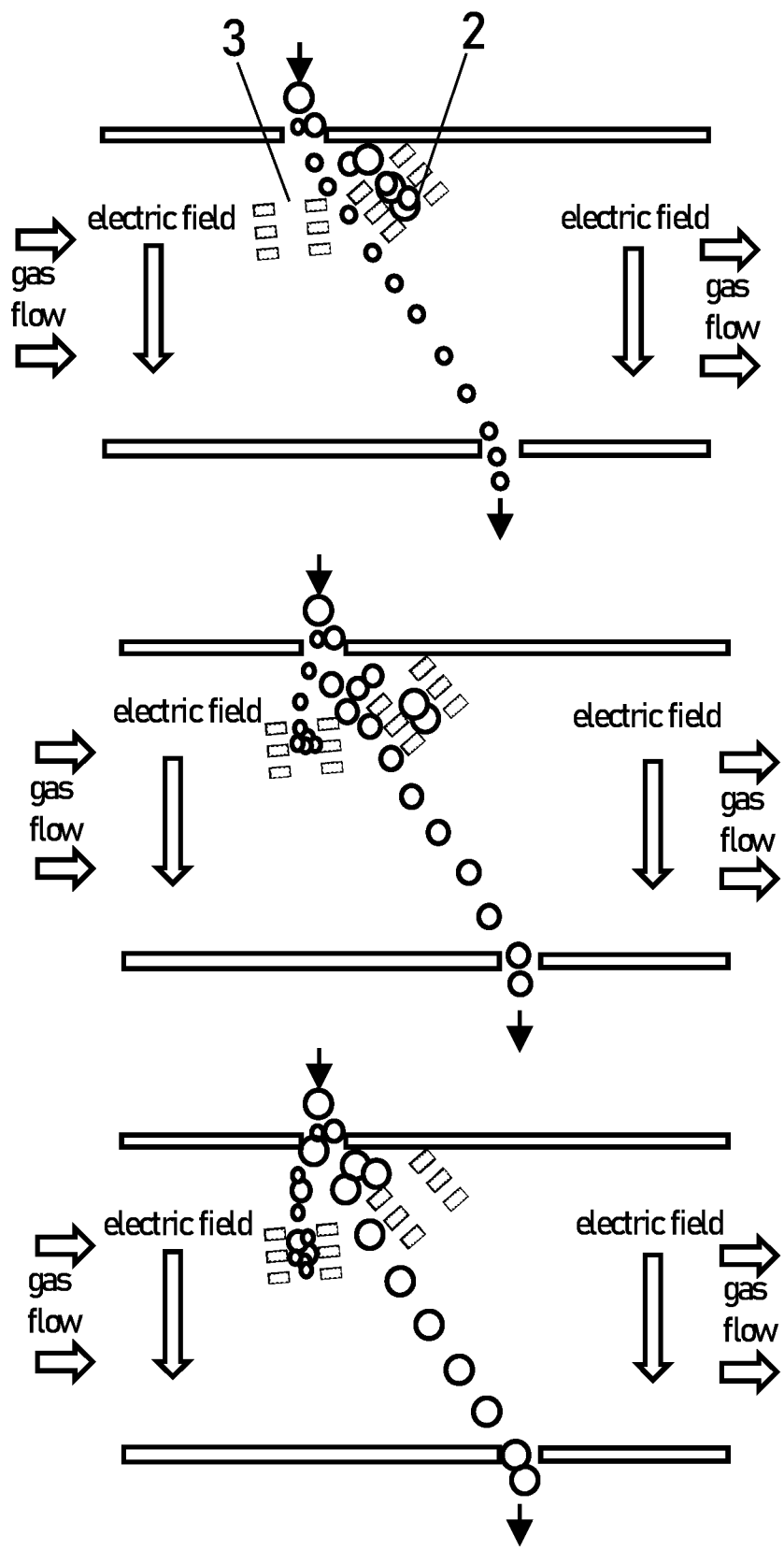
FIG. 8B is a schematic view of an analysis process of an ion mobility analysis apparatus in a second embodiment of the present invention.

FIGS. 8A-8B compares differences in mode of operation between the prior art (referring to FIG. 8A) and the ion mobility analysis apparatus in the second embodiment of the present invention. The ion mobility analyzer of this embodiment is a differential ion mobility analyzer (DMA). As shown in FIG. 8B, the ion mobility analysis apparatus provided in the second embodiment adds the first ion storage zone 2 on the right side and the second ion storage zone 3 on the left side below an ion inlet on the basis of a conventional DMA, a scanning electric field enables the ions to pass through the DMA successively, transmission and storage in the operating process thereof are substantially similar to those in UMA, ions which have not yet reached appropriate transmission conditions are temporarily stored in the first ion storage zone 2, ions which have missed appropriate transmission conditions are temporarily stored in the second ion storage zone 3, and all the ions are transmitted and analyzed together when the transmission conditions are appropriate.

Figure 9:
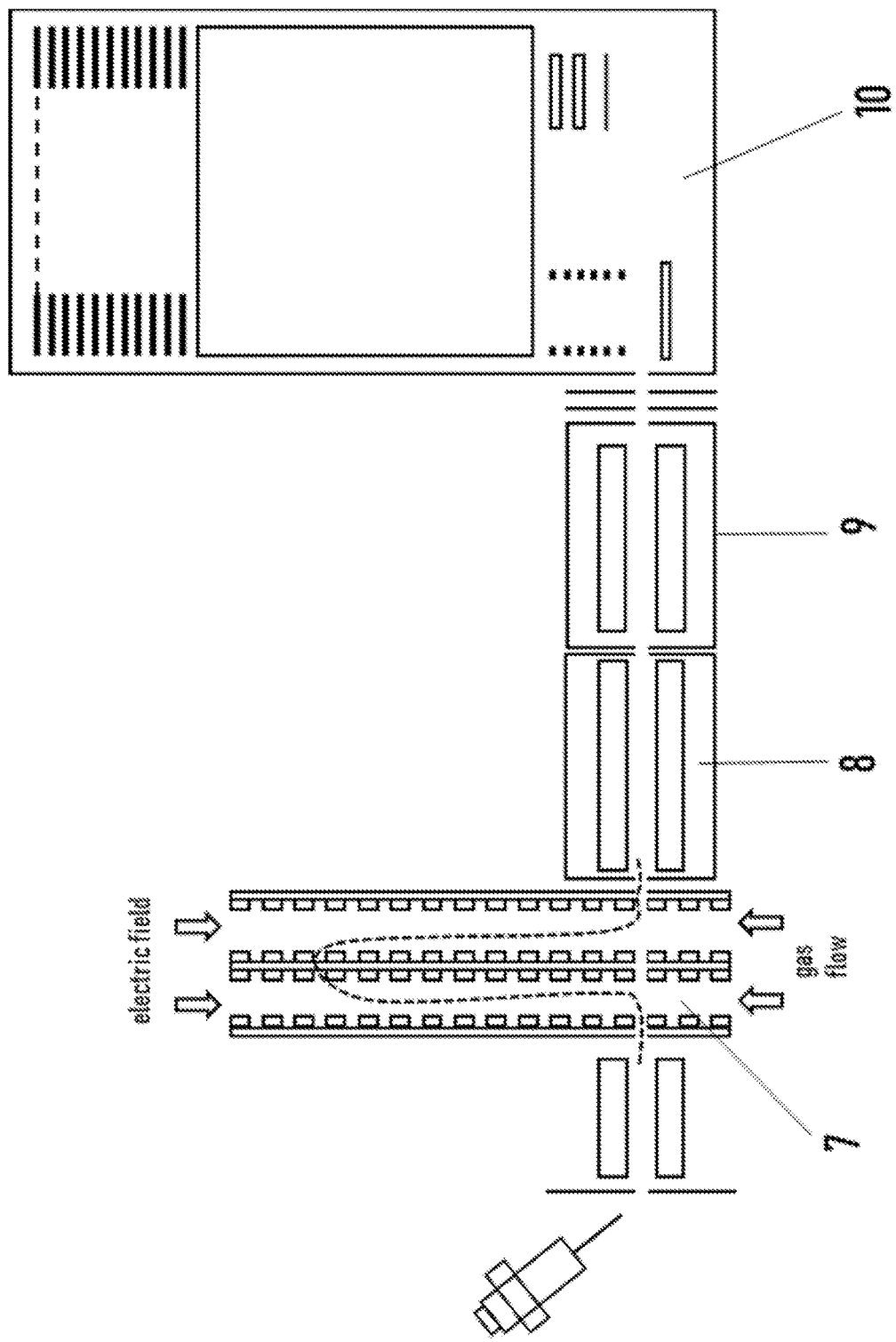
FIG. 9 is a system configuration view in which an ion mobility analysis apparatus of the present invention is used in tandem with a mass analyzer.

FIG. 9 shows a case in which the ion mobility analysis apparatus in the embodiment of the present invention is used in tandem with a mass spectrometer. The mass spectrometer in this example is a quadrupole-time of flight mass spectrometer, the ion mobility analyzer used in the ion mobility analysis apparatus is a U-shaped ion mobility analyzer 7, and the latter stages of the U-shaped ion mobility analyzer are sequentially a quadrupole mass filter 8, a collision cell 9 and a time of flight mass spectrometer 10. For a certain category of substances with similar chemical properties (such as lipids), since there is a trend-line relation between the mobility of the ions and the mass-to-charge ratio (m/z), the scanning of the ion mobility and the scanning of the mass-to-charge ratio can be substantially synchronized, namely: when ions with a certain mobility value or within a certain mobility range pass through, the conditions of a quadrupole rod are set so that ions with the corresponding m/z value or within the corresponding m/z range pass through. Such a mode of operation may enhance the performance of many data acquisition modes currently common. For example, in data-dependent acquisition (DDA), many kinds of parent ions are usually sequentially selected and then fragmented in the collision cell, and then to obtain a product ion spectrum. In the conventional mode, the parent ion utilization efficiency is very low even in synchronization with quadrupole scanning due to the low duty cycle of the ion mobility scanning itself. However, in embodiments of the present invention, scanning of the ion mobility does not lose ions, nor does it lose ions after being in synchronization with the quadrupole rod, thus greatly enhancing the quantification capability of DDA. In data-independent acquisition (DIA), this mode can enhance the qualitative capabilities of DIA. The scanning of the ion mobility analyzer during these acquisitions may be linearly continuous, non-linear, or non-continuous. As long as the scanning process is unidirectional, that is, f(t) is a monotonic function of t, a duty cycle close to 100% can be achieved, which is within the scope of the present invention.

As a variant of the present invention, the ion mobility analysis apparatus may have only the first ion storage zone 2, or only the second ion storage zone 3, or, the first ion storage zone 2 and the second ion storage zone 3 are merged into the same zone. Compared with the prior art, the duty cycle can still be increased even a single ion storage zone is used, and these conditions are also within the protection scope of the present invention.

The above-mentioned embodiments merely illustrate the principles and effects of the present invention, but are not intended to limit the present invention. Anyone skilled in the art can modify or change the above embodiments without departing from the spirit or scope of the present invention. Therefore, all equivalent modifications or changes made by those with ordinary knowledge in the technical field without departing from the spirit and technical idea disclosed in the present invention shall still be covered by the claims of the present invention.

What is claimed is:

1. An ion mobility analysis apparatus, comprising:
an ion source for continuously generating ions, which contain analyte ions;
a first ion storage zone located downstream of the ion source;
a second ion storage zone located downstream of the ion source; and
an ion mobility analyzer located downstream of the ion source for receiving the ions generated by the ion source and performing mobility analysis;
wherein the ion mobility analyzer comprises an ion inlet, a first channel, a second channel and an ion outlet, wherein after the ions generated by the ion source enter the ion inlet, they pass through the first channel and the second channel successively and leave the ion mobility analyzer from the ion outlet, wherein the first ion storage zone is located at an end of the second channel distal to the ion outlet, and the second ion storage zone is located at an end of the first channel proximal to the ion inlet;
wherein the ion mobility analyzer is configured to scan at least one operating parameter that varies according to time t as a function f(t) in an operating period from $t_0$ to $t_1$, so that ions with different mobilities pass through the ion mobility analyzer sequentially, the function f(t) is a monotonic function of time t, the analyte ions pass through the ion mobility analyzer in an operating parameter range of $[f(t_A), f(t_B)]$, and $t_0 < t_A < t_B < t_1$;
the operating period is repeated multiple times, and in each operating period excluding the first operating period:
in the stage of $t_0 \leq t < t_A$, the analyte ions generated by the ion source in the stage of $t_0 \leq t < t_A$ pass through a part of the ion mobility analyzer to enter the first ion storage zone;
in the stage of $t_B \leq t < t_1$, the analyte ions generated by the ion source in the stage of $t_B \leq t < t_1$ pass through a part of the ion mobility analyzer to enter the second ion storage zone; and
in the stage of $t_A \leq t \leq t_B$, the analyte ions generated by the ion source in the stage of $t_A \leq t \leq t_B$, the analyte ions stored in the first ion storage zone in the operating period, and the analyte ions stored in the second ion storage zone in a previous operating period pass through the ion mobility analyzer to enter a next stage analysis apparatus or be detected by a detector.

2. The ion mobility analysis apparatus according to claim 1, wherein
only ions with mobility larger than a pre-set ion mobility $K_1$ pass through the first channel, and only ions with mobility smaller than a pre-set ion mobility $K_2$ pass through the second channel, wherein $K_1 < K_2$, so that only ions with mobility between $K_1$ and $K_2$ pass through the ion mobility analyzer; or
only ions with mobility smaller than a pre-set ion mobility $K_1$ pass through the first channel, and only ions with mobility larger than a pre-set ion mobility $K_2$ pass through the second channel, wherein $K_2 < K_1$, so that only ions with mobility between $K_1$ and $K_2$ pass through the ion mobility analyzer.

3. The ion mobility analysis apparatus according to claim 2, wherein the first channel and the second channel contain a gas flow coaxial with an ion migration direction and a direct current electric field in the opposite direction of the gas flow, and the direct current electric field in the first channel and the direct current electric field in the second channel are different in field strength.

4. The ion mobility analysis apparatus according to claim 2, wherein the operating parameter is an electric field strength.

5. The ion mobility analysis apparatus according to claim 4, wherein the first channel and the second channel are both linear structures, and an included angle between the two channels is not less than 90 degrees.

6. The ion mobility analysis apparatus according to claim 4, wherein the mode of scanning the electric field strength is linear continuous scanning, curvilinear continuous scanning, segmented scanning or a combination of the above scanning mode.

7. The ion mobility analysis apparatus according to claim 2, wherein the first ion storage zone is located in front of the second channel, and the second ion storage zone is located in front of the first channel.

8. The ion mobility analysis apparatus according to claim 7 wherein a radio frequency electric field and a direct current electric field are applied into the first ion storage zone and the second ion storage zone to store the ions.

9. The ion mobility analysis apparatus according to claim 2, wherein the first ion storage zone is located in front of the first channel, and the second ion storage zone is located in front of the second channel.

10. The ion mobility analysis apparatus according to claim 1, wherein further comprising a mass analyzer downstream of the ion mobility analyzer.

11. The ion mobility analysis apparatus according to claim 10, wherein the mass analyzer is a quadrupole mass filter or a magnetic mass analyzer.

12. The ion mobility analysis apparatus according to claim 10, wherein in the stage of $t_A \leq t \leq t_B$, the analyte ions pass through the ion mobility analyzer and enter the mass analyzer, at this time, the operating parameters of the mass analyzer are also set to be suitable for the analyte ions to pass through the mass analyzer.

13. An ion mobility analysis method, comprising:
providing an ion source for continuously generating ions, which contain analyte ions;
providing a first ion storage zone located downstream of the ion source;
providing a second ion storage zone located downstream of the ion source; and
providing an ion mobility analyzer located downstream of the ion source for receiving the ions generated by the ion source and performing mobility analysis;
wherein the ion mobility analyzer comprises an ion inlet, a first channel, a second channel and an ion outlet, wherein after the ions generated by the ion source enter the ion inlet, they pass through the first channel and the second channel successively and leave the ion mobility analyzer from the ion outlet, wherein the first ion storage zone is located at an end of the second channel distal to the ion outlet, and the second ion storage zone is located at an end of the first channel proximal to the ion inlet;
wherein the ion mobility analyzer is configured to scan at least one operating parameter that varies according to time t as a function f(t) in an operating period from $t_0$ to $t_1$, so that ions with different mobilities pass through the ion mobility analyzer sequentially, the function f(t) is a monotonic function of time t, the analyte ions pass through the ion mobility analyzer in an operating parameter range of $[f(t_A), f(t_B)]$, and $t_0 < t_A < t_B < t_1$;

the operating period is repeated multiple times, and in each operating period excluding the first operating period:

in the stage of $t_0 \leq t < t_A$, the analyte ions generated by the ion source in the stage of $t_0 \leq t < t_A$ pass through a part of the ion mobility analyzer to enter the first ion storage zone;

in the stage of $t_B < t \leq t_1$, the analyte ions generated by the ion source in the stage of $t_B < t \leq t_1$ pass through a part of the ion mobility analyzer to enter the second ion storage zone; and in the stage of $t_A \leq t \leq t_B$, the analyte ions generated by the ion source in the stage of $t_A \leq t \leq t_B$, the analyte ions stored in the first ion storage zone in the operating period, and the analyte ions stored in the second ion storage zone in a previous operating period pass through the ion mobility analyzer to enter a next stage analysis apparatus or be detected by a detector.

14. The ion mobility analysis method according to claim 13, wherein only ions with mobility larger than a pre-set ion mobility $K_1$ pass through the first channel, and only ions with mobility smaller than a pre-set ion mobility $K_2$ pass through the second channel, wherein $K_1 < K_2$, so that only ions with mobility between $K_1$ and $K_2$ pass through the ion mobility analyzer; or only ions with mobility smaller than a pre-set ion mobility $K_1$ pass through the first channel, and only ions with mobility larger than a pre-set ion mobility $K_2$ pass through the second channel, wherein $K_2 < K_1$, so that only ions with mobility between $K_1$ and $K_2$ pass through the ion mobility analyzer.

15. The ion mobility analysis method according to claim 14, wherein the first channel and the second channel contain a gas flow coaxial with an ion migration direction and a direct current electric field in the opposite direction of the gas flow, and the direct current electric field in the first channel and the direct current electric field in the second channel are different in field strength.

16. The ion mobility analysis method according to claim 14 wherein the operating parameter is an electric field strength.

* * * * *